United States Patent Office.

THEODOR LANDMANN, OF CINCINNATI, OHIO.

Letters Patent No. 89,933, dated May 11, 1869.

IMPROVED COMPOSITION FOR FLOORS, SIDEWALKS, &c.

The Schedule referred to in these Letters Patent and making part of the same.

*To all whom it may concern:*

Be it known that I, THEODOR LANDMANN, of Cincinnati, in the county of Hamilton, and State of Ohio, have invented a new and improved Composition for Floors, Sidewalks, &c. and I do hereby declare that the following is a full, clear, and exact description thereof, which will enable others skilled in the art to make and use the same.

This invention relates to a new composition for sidewalks, cellars, kitchens, and floors of all kinds, and has for its object to produce a floor or walk which is not affected by the heat of the sun, or of an oven, which can be readily cleaned, and cannot be perforated by rats, mice, or other animals.

The composition is prepared and applied substantially in the following manner:

A first coat, composed of two parts of gravel and one part of cement, mixed in a dry state, and then with water, is applied to the floor, walk, or street to be covered.

It should be about one and a half inch thick, and should be allowed to dry and thicken for a few hours before the second coat is applied.

This second coat consists of one part of iron filings, one part of pure sand, and two parts of cement, all mixed in a dry state, and then with water.

This second coat is applied upon the first, and should be about half an inch thick, and should be well smoothed and pressed by rollers, or otherwise.

When the compound has been allowed to dry for one or more days, it should be soaked with linseed or other oil, which has the quality of not allowing water and frost to enter and affect the mixture.

The compound may be made of various suitable colors, and may be painted after application.

For damp cellars this floor is of very great advantage, as it is water-tight.

Rats and mice cannot eat through it.

It can be readily cleaned by means of a wet cloth, or otherwise.

The aforesaid proportions can be varied, more or less, without materially changing the result.

Having thus described my invention,

I claim as new, and desire to secure by Letters Patent—

1. The compound for floors, sidewalks, &c., herein described, when composed of the ingredients substantially in the manner set forth.

2. Soaking the cement floor or walk with linseed or other oil, after it is dry, to make it water-tight, as specified.

Witnesses:   THEODOR LANDMANN.
H. POHLMANN,
JOSEPH BERDELL.